(12) United States Patent
Takahashi

(10) Patent No.: US 6,933,506 B2
(45) Date of Patent: Aug. 23, 2005

(54) MICROSTRIP GAS CHAMBER

(76) Inventor: Hiroyuki Takahashi, 1-13-5-706, Mukogaoka 1-chome, Bunkyo-ku, Tokyo 113-0023 (JP)

( * ) Notice: Subject to any disclaimer, the term of this patent is extended or adjusted under 35 U.S.C. 154(b) by 362 days.

(21) Appl. No.: 10/312,326
(22) PCT Filed: Jun. 25, 2001
(86) PCT No.: PCT/JP01/05423

§ 371 (c)(1),
(2), (4) Date: Dec. 26, 2002

(87) PCT Pub. No.: WO02/01598

PCT Pub. Date: Jan. 3, 2002

(65) Prior Publication Data

US 2003/0178572 A1 Sep. 25, 2003

(30) Foreign Application Priority Data

Jun. 27, 2000 (JP) .......................................  2000-192180

(51) Int. Cl.[7] ............................................... H01J 47/00
(52) U.S. Cl. .................. 250/385.1; 250/374; 250/336.1
(58) Field of Search ............................. 250/385.1, 374, 250/336.1

(56) References Cited

U.S. PATENT DOCUMENTS 4,642,465 A 2/1987 Britten 6,207,958 B1 * 3/2001 Giakos ..................... 250/385.1
6,703,619 B2 * 3/2004 Takahashi ................ 250/385.1

FOREIGN PATENT DOCUMENTS

EP 0 887 752 A2 12/1998

OTHER PUBLICATIONS

Bellazzinni, et al.; "A Novel Type of Parallel Plate Chamber with Resistive Germanium Anode and a Two–Dimensional Readout;" *Nuclear Instruments and Methods in Physics Research A247*; 1986; pp. 445–452.

Cicognani, et al.; "Study of the Backside Signal of Micro–Strip Gas Counters on Electronic Conducting Glass;" *IEEE Transactions on Nuclear Science*; 1998; pp. 249–251.

* cited by examiner

Primary Examiner—David Porta
Assistant Examiner—Christine Sung
(74) Attorney, Agent, or Firm—Ladas & Parry LLP

(57) ABSTRACT

The present invention relates to a microstrip gas chamber and microstrip plate capable of reading signals from readout electrodes provided at a rear surface of the substrate in a superior manner while having a simple and compact configuration. The microstrip plate comprises an electrically insulating substrate 1, cathodes 2 and anodes 3 arranged alternately at the surface of the substrate 1, read-out electrodes 4 arranged so as to intersect the cathodes 2 and anodes 3 at the rear surface of the substrate 1, wherein a plurality of unitary regions 20 are provided at the surface of the substrate 1 and each unitary region 20 is electrically floated from the cathode via a resistance region 5.

43 Claims, 11 Drawing Sheets

MICROSTRIP GAS CHAMBER

FIELD OF THE INVENTION

The present invention relates to a microstrip gas chamber (hereinafter referred to as an "MSGC") and more specifically relates to an MSGC and microstrip plate (hereinafter referred to as "MS plate") capable of obtaining two-dimensional information.

BACKGROUND ART

MSGC is an abbreviation of MicroStrip Gas Chamber, which is a gas proportional counter capable of positional detection. An MSGC is configured by providing an MS plate made utilizing, for example, photolithographic technology, within a gas chamber. The MS plate is formed by alternately arranging anode electrodes and cathode electrodes on an insulating substrate at intervals of a few hundred micrometers, with positional measurements then being carried out using the electrodes.

Read-out electrodes are provided at the rear surface of the MS plate to obtain two-dimensional information. However, the charge induced at the rear surface of the MS plate is small and therefore the signal obtained at the rear surface-side of the substrate is not large. In particular, with a so-called multi-grid-type MSGC (described later), there is a problem that surface charge is screened so that little charge is induced at the rear surface as a result of the substrate surface being covered by metallic grids.

In order to resolve the aforementioned problems, it is an object of the present invention to provide an MSGC and an MS plate used for MSGC capable of reading signals from readout electrodes provided at a rear surface of the substrate in a superior manner while having a simple and compact configuration.

DISCLOSURE OF THE INVENTION

The present invention is therefore constituted by a microstrip gas chamber comprising a gas volume, an electrically insulating substrate having a surface facing the gas volume, cathodes and anodes arranged alternately on the surface of the substrate, read-out electrodes arranged on the rear surface of the substrate to intersect the cathodes and anodes, and a high-voltage supply for forming a potential difference between the cathodes and the anodes, wherein a multiplicity of unitary regions are provided at the substrate surface, and charge is held at the unitary regions for a predetermined time so as to induce a signal at the rear surface of the substrate via the unitary regions.

The theory of the present invention is now described based on FIG. 4 and FIG. 5. When electrically floating metallic regions are formed at the substrate surface, charge induced on the electrically floating metallic regions is retained, and this charge further induces charge at the rear surface of the substrate. However, when the surface area of the metallic region is relatively large, uniform variations in potential occur at an entire floating metallic region so that position information cannot be reliably captured (FIG. 4(A)) even if a signal can be obtained at the rear surface. With respect to this, in the present invention, unitary regions (referred to in this embodiment as "pads") of a relatively small surface area are provided at the surface of the substrate and are loosely connected to ground potential. In doing this, each unitary region functions as an electrically floating capacitor and the potentials of each of the unitary regions are independent to each other. It is possible to consider the unitary regions as pixels, so to speak, by arranging a multiplicity of the unitary regions so that charge is induced at the rear surface as a result of charge at the surface of each unitary region.

FIG. 5 is an outline view showing the formation of charge induced by the unitary regions 20. Unitary regions 20 formed at cathode surfaces of the cathodes 2 are grounded via resistance regions 5 and electrically floated from the cathodes. When charge is retained at the unitary regions 20, charge is induced at the read-out surface at the rear surface via the substrate. Namely, some of the ions collected at the cathode by movement along the electric field rest on the unitary regions (pads). Charge resting on the pads is retained until the expiration of the RC time constant and charge is therefore induced at the rear surface. One dimensional position information can be acquired from the signal induced at the rear surface.

The unitary regions are electrically connected to the metal cathodes via resistance regions. Namely, each unitary region is in close proximity to the cathode electrode to which the desired potential (cathode potential for collecting charge) is applied via a gap or space (a resistance region). In one preferred embodiment the cathode potential is zero.

The resistance of the resistance region differs depending upon the dimensions of the unitary regions but is preferably $10^6$ to $10^{12}$ ohms in this example, or more preferably $10^9$ to $10^{10}$ ohms. The resistance of the resistance region differs depending upon the dimensions of the unitary regions and/or the gaps but resistance regions are formed from semiconductor or insulator. In one embodiment, the resistance regions are semiconductor regions or insulating regions provided at the surfaces of the cathodes and the unitary regions are constituted by cathode surfaces encompassed by semiconductor or insulating regions. This kind of semiconductor region is formed by depositing a semiconductor such as, for example, Ge, Si or ZnSe etc. In a further preferred example, the resistance region is constituted by a surface of a substrate having electrically insulative properties (weakly conductive properties). This kind of substrate is formed from, for example, quartz glass.

In a still further embodiment, the unitary regions are arranged directly on the substrate in close proximity to the cathodes and the unitary regions are insulated via the resistance of the substrate so that leakage occurs via the substrate. The unitary regions may be divided cathodes formed by dividing the cathodes up and the resistance regions are constituted by the substrate with the divided cathodes being provided on the substrate.

In a still further preferred embodiment, at least one or more grids are arranged so as to extend along the lengthwise direction of the cathodes and anodes between the cathodes and anodes. It is therefore possible to reduce the amount of unnecessary charge occurring at the substrate surface by providing these grid electrodes. On the other hand, when grid electrodes are provided, it becomes difficult for charge to be induced at the rear surface (potential is distributed uniformly over the whole of the substrate surface and it is difficult to obtain position information from charge induced at the rear surface). However, it is possible to induce charge at a rear surface in a superior manner even for MS plates equipped with grid electrodes by providing the aforementioned unitary regions.

BRIEF DESCRIPTION OF THE DRAWINGS

FIG. 1(A) is a view of an MS plate and FIG. 1(B) is an outline perspective view of an MSGC;

FIG. 2(A) is an outline perspective view of an MS plate and FIG. 2(B) is an outline view illustrating reading of two-dimensional position information;

FIG. 4(A) shows a large area metallic region and FIG. 4(B) shows unitary regions relating to the present invention;

BEST MODE FOR CARRYING OUT THE INVENTION

Figure 1:
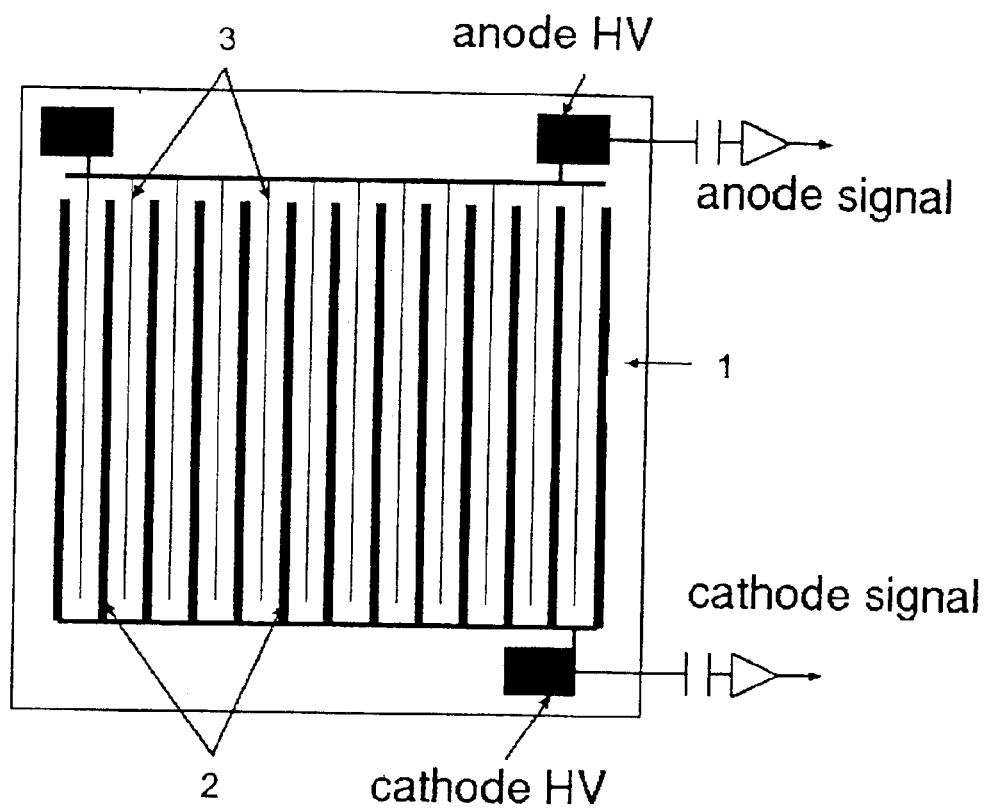
FIG. 1 is a view showing the basic configuration of an MSGC, where
Figure 1:
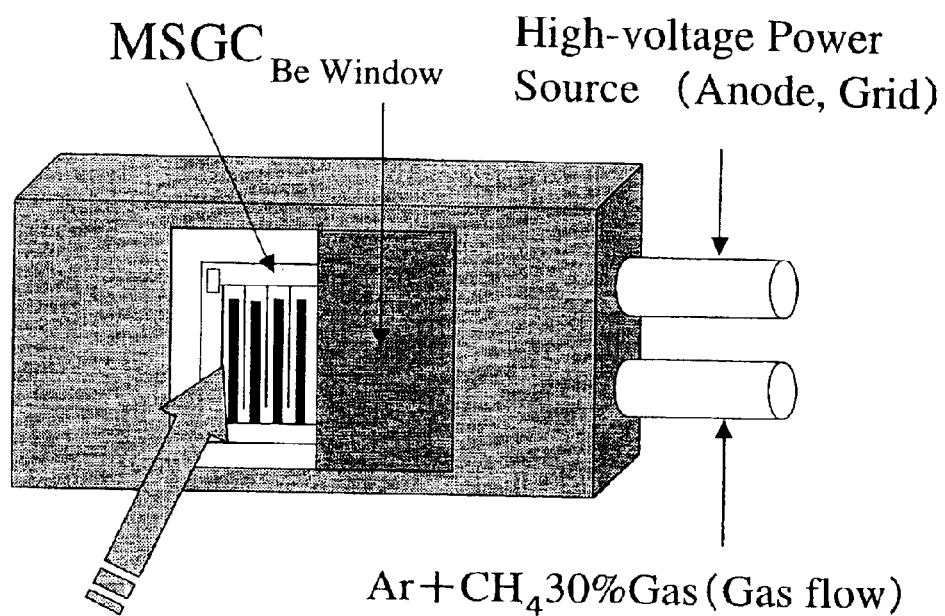
Figure 2:
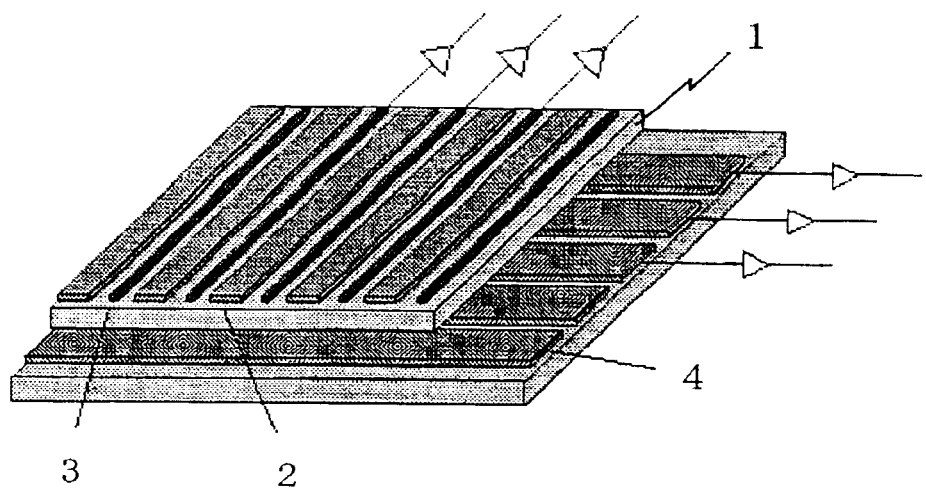
FIG. 2 is a view illustrating an MSGC for obtaining two-dimensional information, where
Figure 2:
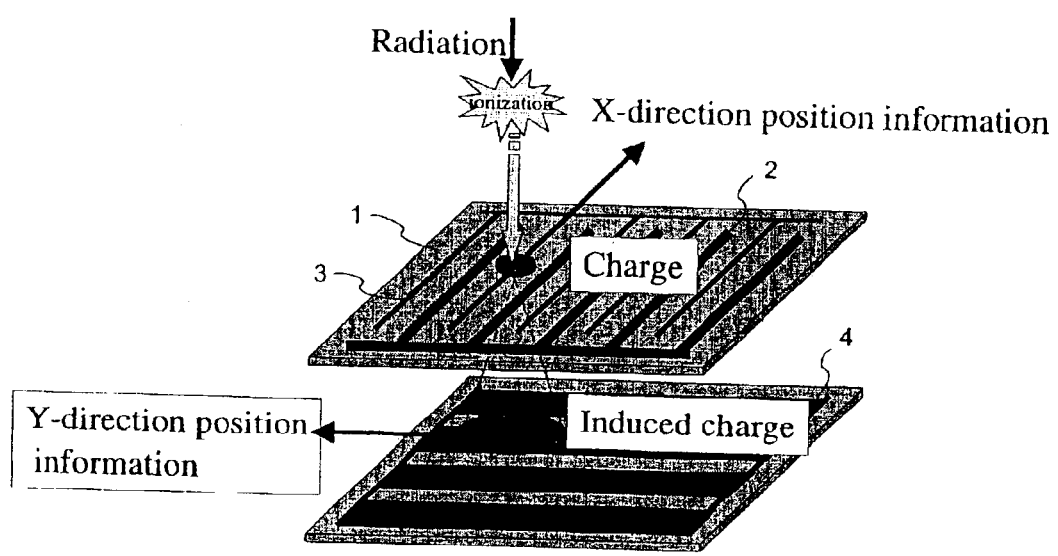

FIG. 1 and FIG. 2 are views showing the basic configuration of the MSGC. The MSGC comprises an electrically insulating substrate 1 provided with a gas volume introduced into the chamber and a surface exposed to the gas volume, metallic cathode strips 2 and metallic anode strips 3 arranged alternately at the surface of the substrate 1, and read-out electrodes (backstrips) 4 arranged so as to extend orthogonally with respect to the cathode strips 2 and anode strips 3 at the rear surface of the substrate 1. The MSGC is equipped with a high-voltage supply for forming potential differences between the neighboring cathode strips 2 and anode strips 3. Gas amplification is then caused by applying a high voltage between the both electrodes (the cathode strips 2 and the anode strips 3) and a signal is read from the anode strips 3 (X-direction position information). The charge adhered to the surface of the substrate induces charge at the rear side of the substrate 1 and the read-out electrode 4 reads a signal based on the induced charge (position information in the Y-direction). To give an example of the dimensions of the MS plate, the pitch of the electrodes is 200 to 1000 micrometers, the cathode width is 100 to 400 micrometers, the anode width is 5 to 10 micrometers, and the dimensions of the substrate are 200 mm by 200 mm.

Figure 3:
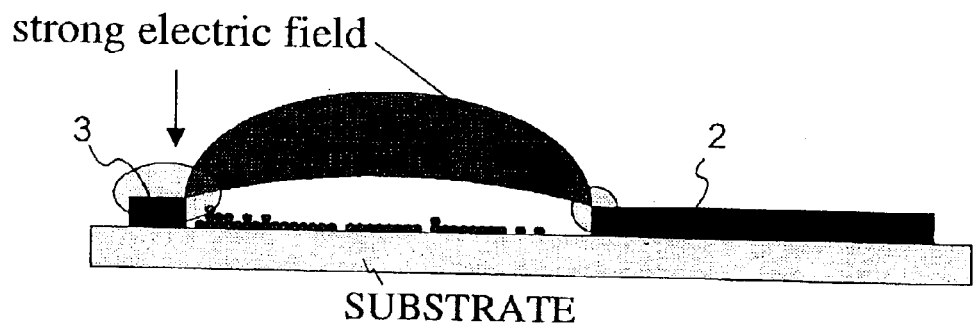
FIG. 3(A) is a side view of a typical MS plate and FIG. 3(B) is a side view of a multi-grid type MS plate.
Figure 3:
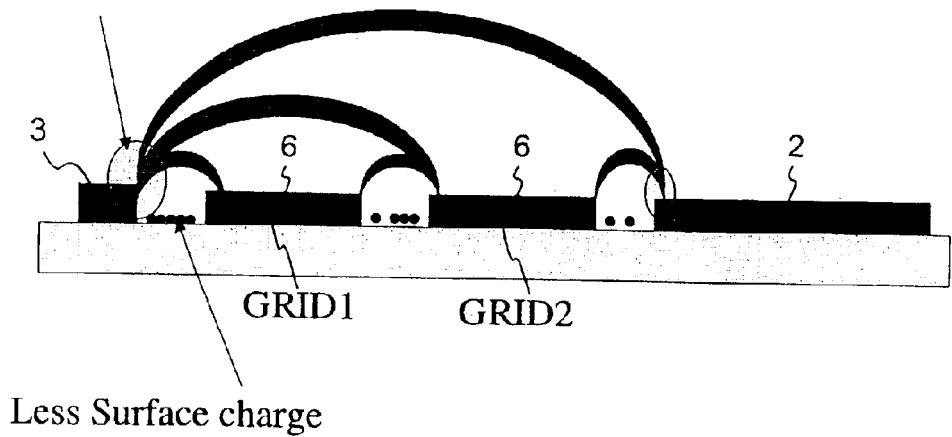
Figure 4:
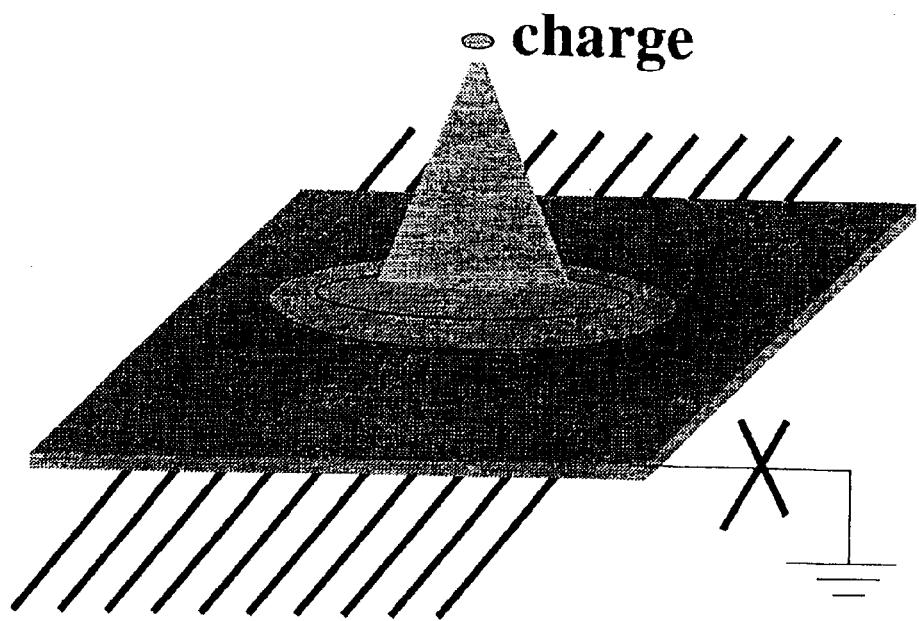
FIG. 4 is a view showing induction of charge to a rear surface via a metal region, where
Figure 4:
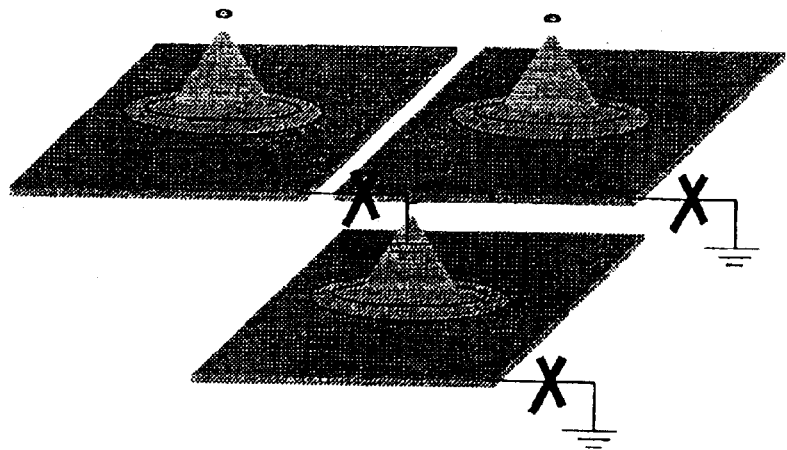
Figure 5:
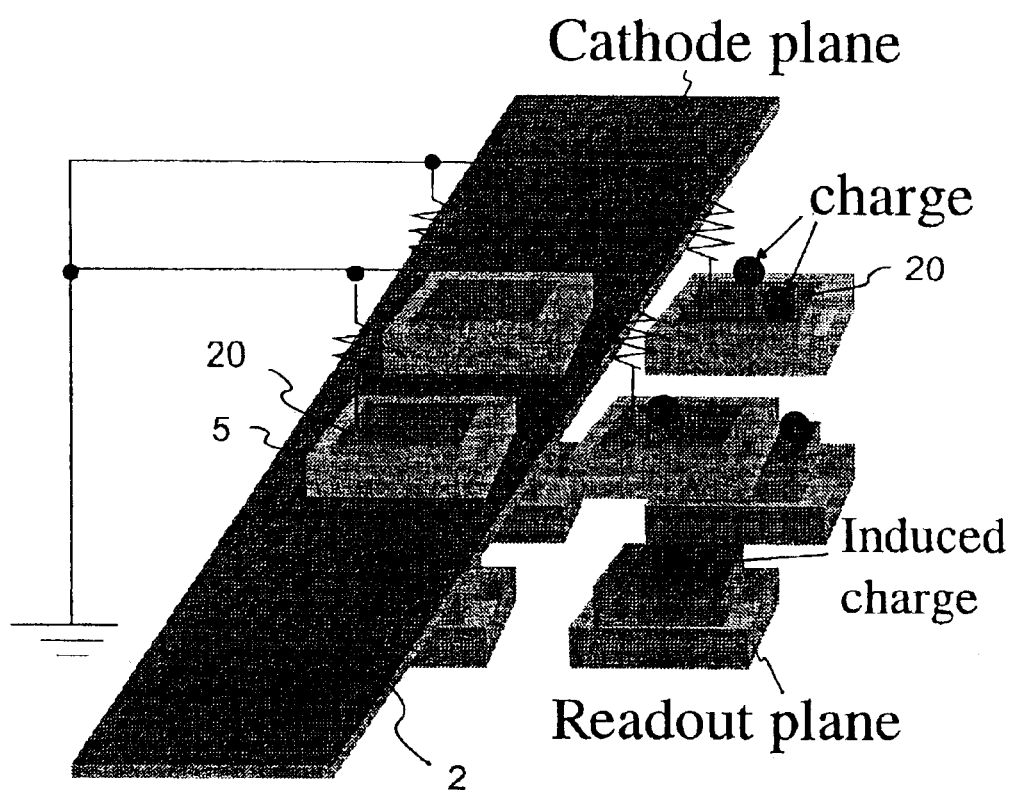
FIG. 5 is an outline view showing the formation of charge induced by the unitary regions.

The MS plate of an embodiment of the present invention is shown as being provided with a plurality of grids 6 extending parallel to the cathodes 2 and anodes 3 between the cathode strips 2 and anode strips 3. A description of this kind of so-called multi-grid type MS plate is given based on FIG. 3. FIG. 3(A) shows a typical MS plate that does not have a grid. In this case, there is the difficulty that surface charge becomes affixed to the surface of the substrate between the anode strips 3 and cathode strips 2 so that the electric field therefore becomes distorted and the gain becomes unstable. The charge becoming attached to the surface of the substrate 1 is therefore reduced by providing additional electrodes (the grids 6) between the cathode strips 2 and anode strips 3. The grids 6 also act to prevent discharge between the anode strips 3 and the cathode strips 2. The grids 6 are strips extending parallel to the anode strips 3 and the cathode strips 2, with one or more grids being provided between the anode strips 3 and the cathode strips 2. On the other hand, at the MS plate having the grids 6, the metallic regions occurring at the substrate surface become larger. The signal induced to the rear surface of the substrate is therefore reduced compared to the MS plate that does not have grids due to the screening effect of the surface charge caused by the metallic strips on the substrate surface. The present invention is therefore particularly effective when adopted by multi-grid type MSGCs.

Figure 6:
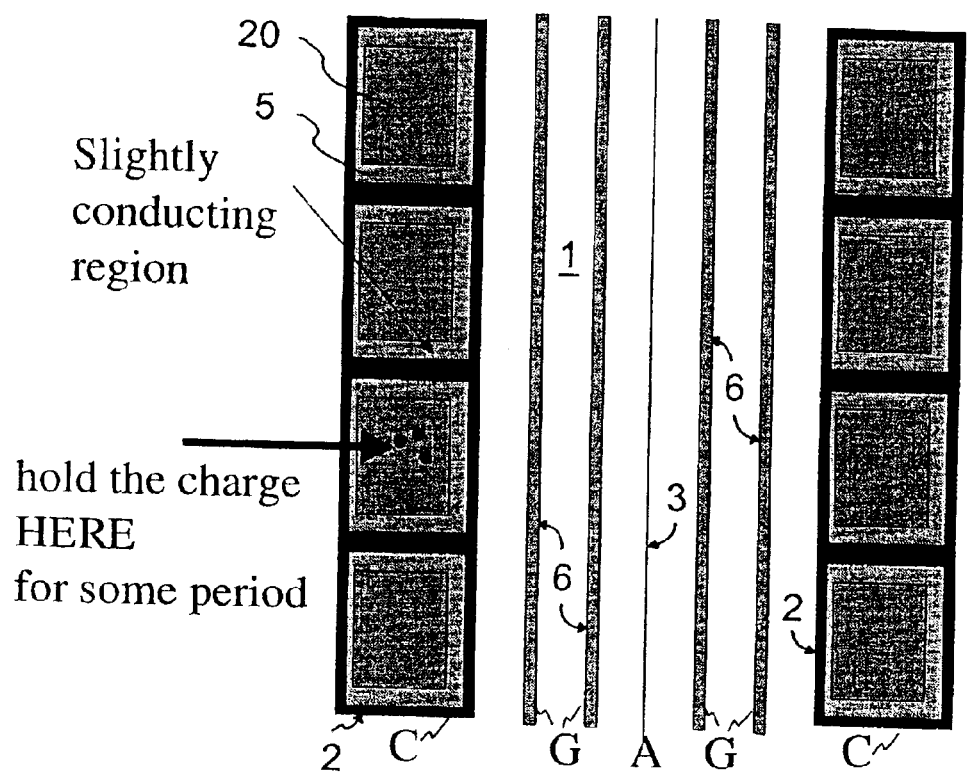
FIG. 6 is an enlarged plan view of a portion of the MS plate relating to an embodiment of the present invention.

FIG. 6 is a schematic view showing an embodiment of the present invention. The MS plate comprises a transparent insulating substrate 1 composed of quartz glass, a cathode 2 and an anode 3 made of chrome strips provided alternately in parallel at the surface of the substrate 1, and strip-shaped read-out electrodes (not shown in FIG. 6) extending in a direction orthogonal to the lengthwise direction of the cathodes 2 and anodes 3 at the rear surface of the substrate 1. Two grid strips are also provided parallel to the cathode strips 2 and the anode strips 3 between the cathode strips 2 and the anode strips 3. A plurality of rectangular unitary regions 20 are arranged in a lengthwise direction of the cathode strips 2 via gaps at the surface of the cathode strips 2. Each unitary region 20 is surrounded by a resistance region 5 and is electrically connected to the cathode strip 2 via each resistance region 5. In other words, each unitary region 20 is insulated from the cathode strip 2 by each resistance region 5. A resistance region is formed by depositing a semiconductor such as, for example, Ge, Si or ZnSe etc. In a further preferred example, the resistance region is constituted by an exposed surface of a substrate having electrically insulative properties.

Figure 7:
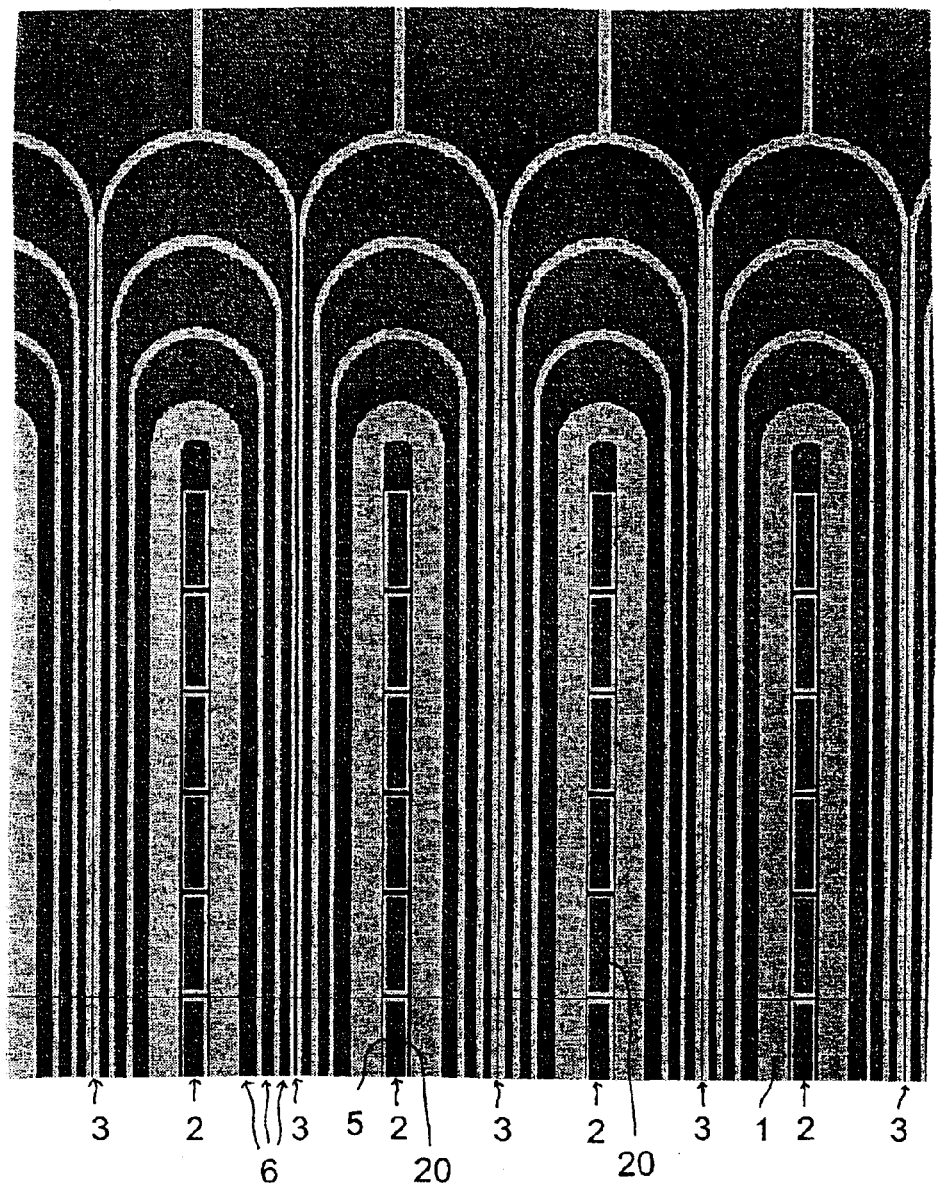
FIG. 7 is an outline plan view of an MS plate relating to the embodiment.

FIG. 7 is a partial plan view showing an embodiment analogous to FIG. 6. Cathode strips 2 and anode strips 3 made of chrome are formed on the quartz glass substrate 1. A plurality of unitary regions 20 spaced in the lengthwise direction are formed at the surfaces of the cathodes 2. In FIG. 7, the width of the cathodes 2 is 60 micrometers, the width of the anodes 3 is 5 micrometers, the gaps between the anodes 2 are 400 micrometers, the gaps between each electrode are 10 micrometers, the heights (thickness) of the cathodes 2 and anodes 3 is 0.2 micrometers, and the dimensions of the unitary regions are 50 micrometers×400 micrometers. The substrate is formed from 4 cm×4 cm (sensitive region) quartz glass (actual size of substrate is 5 cm×5 cm) selected at an appropriate thickness in a range from approximately 0.1 mm to 2.5 mm but, considering the reading of a signal from the rear surface, it is preferable for the substrate 1 to be thinner. In FIG. 7, the resistance regions 5 are constituted by exposed surfaces of the substrate 1.

Figure 8:
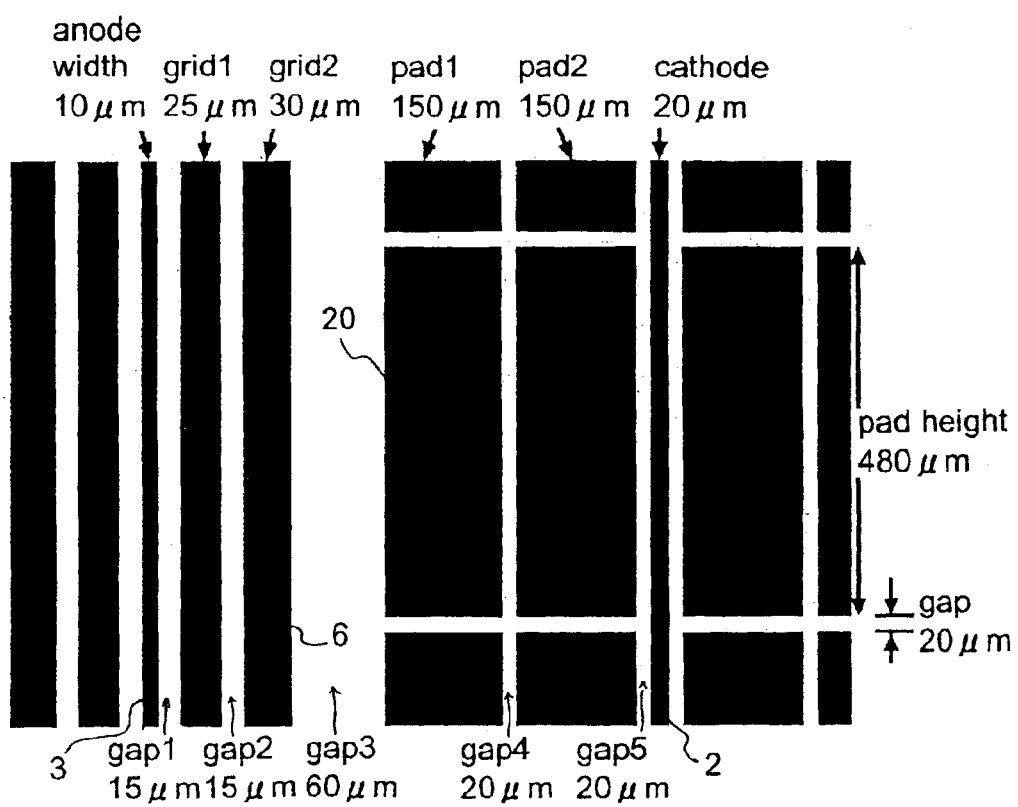
FIG. 8 is a plan view of an enlarged portion of an MS plate relating to a further embodiment.

FIG. 8 shows a further embodiment of the present invention. Anode strips 2 and cathode strips 3 are arranged at the surface of the substrate. Grids 6 and pads 20 constituting the unitary regions are arranged between the anode strip 2 and the cathode strip 3. The grids 6 are arranged so that two grids "grid 1" and "grid 2" are in close proximity to the anode strips 3. The pads 20 are formed from the rectangular unitary regions and are arranged as rows of pad groups via predetermined gaps in the extending direction of the cathode strips 3 in close proximity to the cathode strips 3. As shown in the drawings, two rows of pad groups ("pad 1" and "pad 2") are arranged. The thickness of the substrate is 2.3 mm and a plurality of read-out electrodes are arranged at the rear surface.

In FIG. 8, the anode width is 10 micrometers, the width of "grid 1" is 25 micrometers, the width of "grid 2" is 30 micrometers, the width of "pad 1" is 150 micrometers, the width of "pad 2" is 150 micrometers, and the width of the cathode is 20 micrometers. A "gap 1" between the anode strips 3 and the "grid 1" is 15 micrometers, the "gap 2" between "grid 1" and "grid 2" is 15 micrometers, the "gap 3" between "grid 2" and "pad 1" is 60 micrometers, the "gap 4" between "pad 1" and "pad 2" is 20 micrometers, and the gap 5 between "pad 2" and the cathode strips 2 is 20 micrometers. The dimension of the pad units in the lengthwise direction is 480 micrometers and the gaps in the lengthwise direction between the pads are 20 micrometers.

In FIG. 8, an amplification region on the side of the anode strips 3 and a readout pixel region on the side of the cathode strips 2 are formed at the substrate surface of the MS plate. These two regions are separated by the "gap 3" between the grids 2 and the pads 1 which is a larger gap. The amplification region includes grids on both sides of the anode strips 2 and has a width of 180 micrometers (one anode, two "grids 1", and two "grids 2"). The potential of "grid 2" and the cathode strip 2 is zero and the pad potential is brought to zero potential via the resistance of the substrate surface.

The MS plate relating to the present invention is located within a chamber into which gas is introduced so as to form an MSGC and this can be used as an X-ray or particle beam image detector. Gas is introduced into the chamber, a voltage is applied across the cathode 2 and the anode 3, amplification is caused as a result of an electron avalanche within the gas, and a particle beam signal is extracted. When grids 6 are provided, an appropriate voltage is applied to the grids 6 from outside. The cathode 2, anode 3 and read-out electrodes 4 constituting the MS plate are respectively connected to the signal detection circuit, and the signal is subjected to analytical processing by a computer. Circuits for detecting by reading the signals obtained at each electrode are well known to one skilled in the art.

Figure 9:
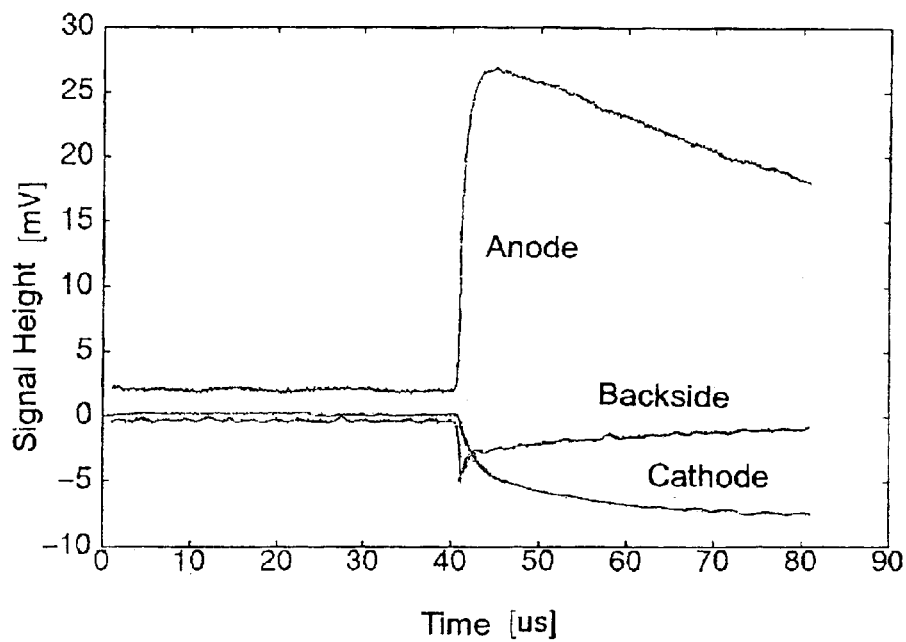
FIG. 9 shows the height of each signal occurring for a substrate 2.3 mm thick.
Figure 10:
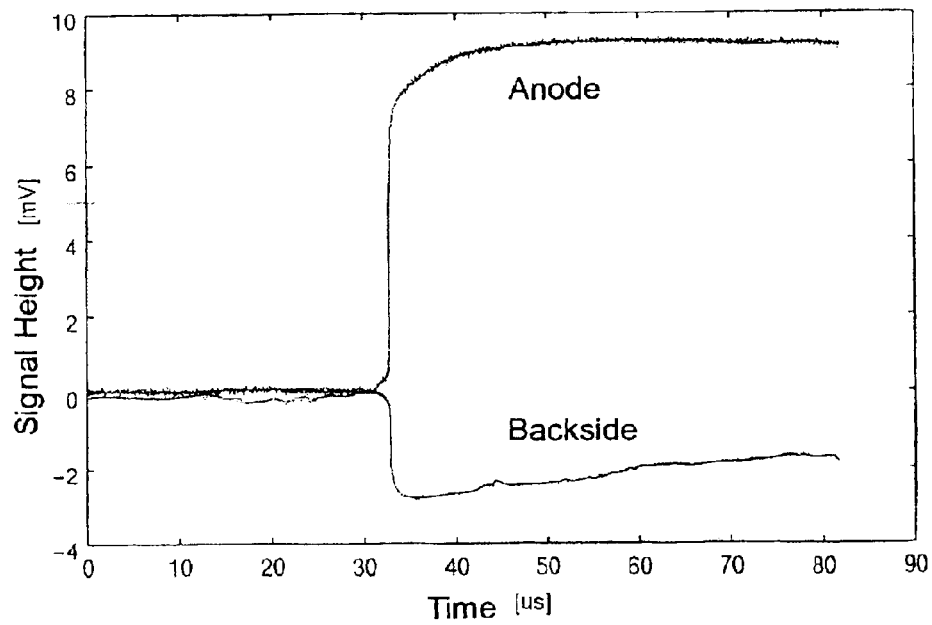
FIG. 10 shows the height of anode signals and rear surface signals occurring for a substrate 0.45 mm thick.
Figure 11:
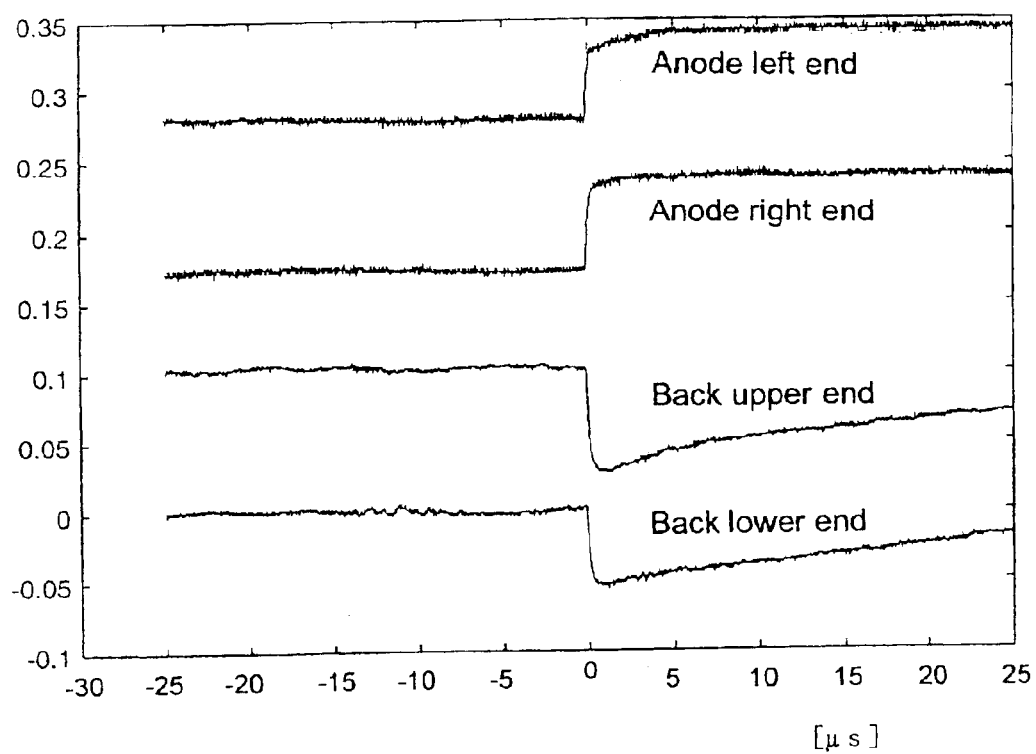
FIG. 11 shows voltages for each signal occurring for a substrate 0.3 mm thick.

FIG. 9 to FIG. 11 are views showing the height of signals at the rear surface with respect to signals at the surface. FIG. 9 is for measuring under conditions of 5. 9 keV X-rays, a substrate thickness of 2.3 mm, and a pitch between the anodes of 400 micrometers, with the rear surface signal being approximately 20% of the signal height value of the surface signal. In FIG. 10, measurements are taken with the pads fully provided between the anode and the cathode under the conditions of 5.9 keV x-rays, a substrate thickness of 0.45 mm, and a pitch between anodes of 1 mm. The rear surface signal is then approximately 35% of the signal height value of the surface signal. FIG. 11 shows waveforms for signals for both of the terminals of the anode for the surface, and both of the terminals for the read-out electrode of the rear surface for a charge division method for an MS plate for two-dimensional reading constructed by making a pattern on a composite quartz glass substrate of a thickness of 300 micrometers. This is a graph taken for X-rays of an energy of 6 keV with the vertical axis representing voltage (v) and the horizontal axis representing time (microsecond).

INDUSTRIAL APPLICABILITY

According to the present invention, charge is held at each unitary region just for the time required to read signals from the rear surface and a signal can be induced at the rear surface. This can be used effectively with two-dimensional MSGCs.

What is claimed is:

1. A microstrip gas chamber comprising:
   a gas volume;
   an electrically insulating substrate having a front surface which faces said gas volume;
   cathodes and anodes alternately provided on said front surface of the substrate;
   readout electrodes provided on a rear surface of the substrate to intersect said cathodes and anodes;
   a high voltage source for establishing a potential difference between the cathode and anode; and
   a plurality of unitary regions provided on said front surface, and said unitary regions retaining charge thereon so as to induce a signal on said rear surface of the substrate.

2. The microstrip gas chamber of claim 1, wherein said unitary region is electrically floated from the cathode.

3. The microstrip gas chamber of claim 1, wherein said unitary region is electrically connected to the cathode via a resistance region.

4. The microstrip gas chamber of claim 1, wherein said unitary region is electrically insulated from the cathode.

5. The microstrip gas chamber of claim 1, wherein said unitary region is in close proximity to the cathode via a predetermined gap.

6. The microstrip gas chamber of claim 1, wherein said unitary region is a surface of cathode surrounded by a resistance region provided on the surface of cathode.

7. The microstrip gas chamber of claim 1, wherein a resistance region is formed by the substrate.

8. The microstrip gas chamber of claim 6, wherein said unitary regions are a plurality of pad provided on the surface of the substrate.

9. The microstrip gas chamber of claim 8, wherein said pads are in close proximity to the cathode and spaced apart to each other with a predetermined gap in the lengthwise of the cathode.

10. The microstrip gas chamber of claim 9, wherein said pads are also spaced apart to each other in a widthwise of cathode with a predetermined gap.

11. The microstrip gas chamber of claim 8, wherein at least one grid is provided between the cathode and the anode and extends in the lengthwise of the anode and the cathode and wherein a gap between the neighboring grid and pad is set to be wider than a gap between neighboring electrodes.

12. The microstrip gas chamber of claim 11, wherein a grid potential of grid neighboring the pad is zero.

13. The microstrip gas chamber of claim 11, wherein an amplification region is formed at an anode side of the wider gap and wherein a read-out region is formed at a cathode side of the wider gap.

14. The microstrip gas chamber of claim 1, wherein a potential of cathode is zero.

15. The microstrip gas chamber of claim 1, wherein at least one grid is provided between the cathode and anode and extends in the lengthwise of the anode and the cathode.

16. The microstrip gas chamber of claim 1, wherein the unitary regions are arranged in the lengthwise of the anode strip and the cathode strip with a gap.

17. The microstrip gas chamber of claim 16, wherein a group of unitary regions extending in the lengthwise of the anode and cathode strips are provided in rows in a widthwise of the anode and cathode strips with a predetermined gap.

18. The microstrip gas chamber of claim 1, wherein said unitary region is a rectangular.

19. A microstrip plate comprising:
   an electrically insulating substrate;
   cathodes and anodes alternately provided on a front surface of the substrate;
   read-out electrodes provided on a rear surface of the substrate to intersect said cathodes and anodes; and a plurality of unitary regions provided on said front surface for retaining charge thereon.

20. The microstrip plate of claim 19, wherein said unitary region is electrically floated from surrounding elements.

21. The microstrip plate of claim 19, wherein said each unitary region is electrically floated.

22. The microstrip plate of claim 19, wherein said each unitary region is surrounded by a resistance region.

23. The microstrip plate of claim 22, wherein a resistance of said resistance region is ranged from 106 to 1012 ohms.

24. The microstrip plate of claim 19, wherein said unitary region is electrically connected to the cathode by a resistance region.

25. The microstrip plate of claim 24, wherein said resistance region is made of a semiconductor.

26. The microstrip plate of claim 24, wherein said resistance region is made of an insulator.

27. The microstrip plate of claim 19, wherein said unitary region is a surface of cathode surrounded by a resistance region provided on the surface of cathode.

28. The microstrip plate of claim 19, wherein a resistance region is formed by the substrate.

29. The microstrip plate of claim 28, wherein said unitary regions are in close proximity to the cathode and spaced apart to each other with a predetermined gap on the substrate.

30. The microstrip plate of claim 19, wherein said unitary regions are surface of a divided cathode formed by dividing the cathode.

31. The microstrip plate of claim 19, wherein at least one grid is provided between the cathode and anode and extends in the lengthwise of the anode and the cathode.

32. A method of increasing a read-out signal from a rear surface of microstrip gas chamber, said microstrip gas chamber comprising an electrically insulating substrate, cathodes and anodes alternately provided on a front surface of the substrate, and read-out electrodes provided on a rear surface of the substrate to intersect said cathodes and anodes, said method comprising:

providing a plurality of unitary regions on said front surface, said unitary regions being electrically floated from surrounding elements;

retaining charge on said unitary region so as to induce a signal at the rear surface of the substrate.

33. A microstrip gas chamber comprising:

a gas volume;

an electrically insulating substrate having a first surface and a second surface, said first surface being exposed to said gas volume;

one or more cathode strips and one or more anode strips alternately provided on said first surface;

one or more read-out electrodes provided on said second surface and extending orthogonally to said cathode and anode strips;

a high voltage source for establishing a potential difference between the anode and cathode strips; and a plurality of electrically floating regions provided on said first surface, and said regions retaining charge thereon so as to induce a signal on said second surface.

34. The microstrip gas chamber of claim 33, wherein said each electrically floating region is provided in close proximity to said cathode strip via a resistance region.

35. The microstrip gas chamber of claim 33, wherein said each electrically floating region is loosely electrically coupled to said cathode strip.

36. The microstrip gas chamber of claim 33, wherein said each electrically floating region is provided on said first surface via a resistance region.

37. The microstrip gas chamber of claim 36, wherein said resistance region is a portion of substrate.

38. The microstrip gas chamber of claim 33, wherein said each electrically floating region is provided on a portion of said cathode strip via a resistance region.

39. The microstrip gas chamber of claim 33, wherein said each electrically floating region is loosely electrically coupled to a ground potential.

40. The microstrip gas chamber of claim 33, wherein at least one grid is provided between the cathode and anode and extends in the lengthwise of the anode and the cathode.

41. The microstrip gas chamber of claim 33, wherein at least one grid is provided on the first surface adjacent said anode and extends in the lengthwise of the anode, and wherein said electrically floating regions are provided on the first surface adjacent said cathode and aligned in the lengthwise of said grid, and wherein said grid and said electrically floating regions are separated by a wider gap.

42. The microstrip gas chamber of claim 41, wherein an amplification region is formed at an anode side and wherein a read-out region is formed at a cathode side.

43. The microstrip gas chamber of claim 33, wherein said electrically floating regions are pads.

* * * * *